(12) United States Patent
Nim

(10) Patent No.: US 8,301,310 B2
(45) Date of Patent: Oct. 30, 2012

(54) WIND TURBINE OPERATIONAL METHOD

(75) Inventor: Erik Nim, Zamudio (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 580 days.

(21) Appl. No.: 12/300,178

(22) PCT Filed: May 29, 2007

(86) PCT No.: PCT/ES2007/000314
§ 371 (c)(1),
(2), (4) Date: Nov. 10, 2008

(87) PCT Pub. No.: WO2007/138138
PCT Pub. Date: Dec. 6, 2007

(65) Prior Publication Data
US 2009/0224542 A1 Sep. 10, 2009

(30) Foreign Application Priority Data

May 31, 2006 (ES) .................................. 200601445

(51) Int. Cl.
*G05D 11/00* (2006.01)
(52) U.S. Cl. .......................................... 700/287; 290/44
(58) Field of Classification Search .................. 700/287, 700/290
See application file for complete search history.

(56) References Cited

U.S. PATENT DOCUMENTS

| | | | | |
|---|---|---|---|---|
| 4,189,648 A * | 2/1980 | Harner | ............................. | 290/44 |
| 4,426,192 A * | 1/1984 | Chertok et al. | .................... | 416/1 |
| 4,584,486 A * | 4/1986 | Quynn | ............................. | 290/44 |
| 6,137,187 A * | 10/2000 | Mikhail et al. | .................... | 290/44 |
| 6,320,272 B1 * | 11/2001 | Lading et al. | .................... | 290/44 |
| 6,600,240 B2 * | 7/2003 | Mikhail et al. | .................... | 307/85 |
| 7,289,920 B2 * | 10/2007 | Suliman et al. | .................... | 702/64 |
| 7,317,260 B2 * | 1/2008 | Wilson | ............................ | 290/44 |
| 7,761,190 B2 * | 7/2010 | Delmerico et al. | ............ | 700/297 |
| 2002/0105189 A1* | 8/2002 | Mikhail et al. | .................... | 290/44 |
| 2004/0094964 A1* | 5/2004 | Mikhail et al. | .................... | 290/44 |
| 2004/0207208 A1* | 10/2004 | Mikhail et al. | .................... | 290/44 |

(Continued)

FOREIGN PATENT DOCUMENTS

EP 1 460 266 9/2004

OTHER PUBLICATIONS

Leithead, W. E., et al. "Direct Regulation of Large Speed Excursions for Variable Speed Wind Turbines." European Wind Energy Conference EWEC'99 (1999) pp. 857-860.

(Continued)

*Primary Examiner* — Mohammad Ali
*Assistant Examiner* — Anthony Whittington
(74) *Attorney, Agent, or Firm* — Ladas & Parry LLP

(57) ABSTRACT

Operation method for a variable speed wind turbine which comprises control methods for blade pitch in cases of extreme gusts of wind, characterized by the fact that it is comprised of the following steps: a) detection of the presence of an extreme gust of wind; b) performance of a sudden increase in pitch within the range of 6 to 14 degrees at the maximum speed permitted by the wind turbine blade pitch control mechanisms. The method also includes an additional step; c) vary the generator speed to avoid an increased acceleration of the generator which could make a subsequent step b) necessary.

9 Claims, 5 Drawing Sheets

U.S. PATENT DOCUMENTS

| | | | | |
|---|---|---|---|---|
| 2004/0217594 | A1* | 11/2004 | Feddersen et al. | 290/44 |
| 2004/0217596 | A1* | 11/2004 | Feddersen et al. | 290/44 |
| 2004/0222642 | A1* | 11/2004 | Siebenthaler et al. | 290/44 |
| 2005/0012339 | A1* | 1/2005 | Mikhail et al. | 290/44 |
| 2005/0253396 | A1* | 11/2005 | Mikhail et al. | 290/44 |
| 2006/0033338 | A1* | 2/2006 | Wilson | 290/44 |
| 2007/0018457 | A1* | 1/2007 | Llorente Gonzalez | 290/44 |
| 2007/0057517 | A1* | 3/2007 | McNerney | 290/44 |
| 2008/0206051 | A1* | 8/2008 | Wakasa et al. | 416/41 |
| 2009/0060740 | A1* | 3/2009 | Stiesdal et al. | 416/41 |
| 2009/0169379 | A1* | 7/2009 | McClintic | 416/31 |
| 2009/0295159 | A1* | 12/2009 | Johnson et al. | 290/44 |

OTHER PUBLICATIONS

Muljadi, E., et al. "Pitch-Controlled Variable-Speed Wind Turbine Generation." Presented at the 1999 IEEE Industry Application Society Annual Meeting Phoenix, Arizona (1999).

Horiuchi, N., et al. "Torque and Power Limitations of Variable Speed Wind Turbines Using Pitch Control and Generator Power Control." Power Engineering Society Summer Meeting (2001) IEEE, vol. 1, pp. 638-643.

* cited by examiner

WIND TURBINE OPERATIONAL METHOD

FIELD OF THE INVENTION

The invention relates to a wind turbine operational method and in particular to a wind turbine operational method for cases of extreme operating wind gust.

BACKGROUND

Variable speed wind turbines with pitch control means are well known in the art.

These control means include at least an actuator and an adjusting transmission connected to a control device.

The control device receives input data from selected wind turbine components and sends output data to the actuator for changing the angular position of the blades according to certain rules allowing the implementation of operational methods intended for optimisation of the power production and for protection of the wind turbine in the event of high wind speeds or wind turbine failures.

One of these events is an extreme operating wind gust which produces extreme loads on main structural components such as the blade root and the tower bottom. In this case, the known art usually proposes using said control means for shutting down the turbine. For example, WO 2004/077068 describes the use of lidar means for detecting gusts long before the wind change reaches the turbine tower so that the blades could be feathered using the pitch control means.

The objective of this invention is a method to deal with this case keeping the wind turbine in operation and minimizing the bending moments in the blade root and in the tower bottom.

SUMMARY OF THE INVENTION

To accomplish this objective the present invention provides a method for the operation of a variable-speed wind turbine having pitch control means in cases of an extreme operating wind gust characterized in that it includes the following steps:

a) detecting the presence of an extreme operating wind gust;

b) performing a sudden increase of the pitch angle in the range of 6 to 14 deg at the maximum pitch rate allowed by the wind turbine pitch control means.

In a preferred embodiment the method also includes the following additional step:

c) varying the generator speed to avoid large generator accelerations that may result in the need for a subsequent step b).

In a preferred embodiment, the presence of an extreme operating wind gust is detected when the generator acceleration is higher than a predetermined value during a minimum predetermined time.

In another preferred embodiment, the presence of an extreme operating wind gust is detected using lidar means.

Other features and advantages of the present invention will be understood from the following detailed description of an illustrative and by no means limiting embodiment of its object in relation with the enclosed drawings.

BRIEF DESCRIPTION OF DRAWINGS

FIG. 2, which includes

DETAILED DESCRIPTION OF PREFERRED EMBODIMENTS

Figure 1:
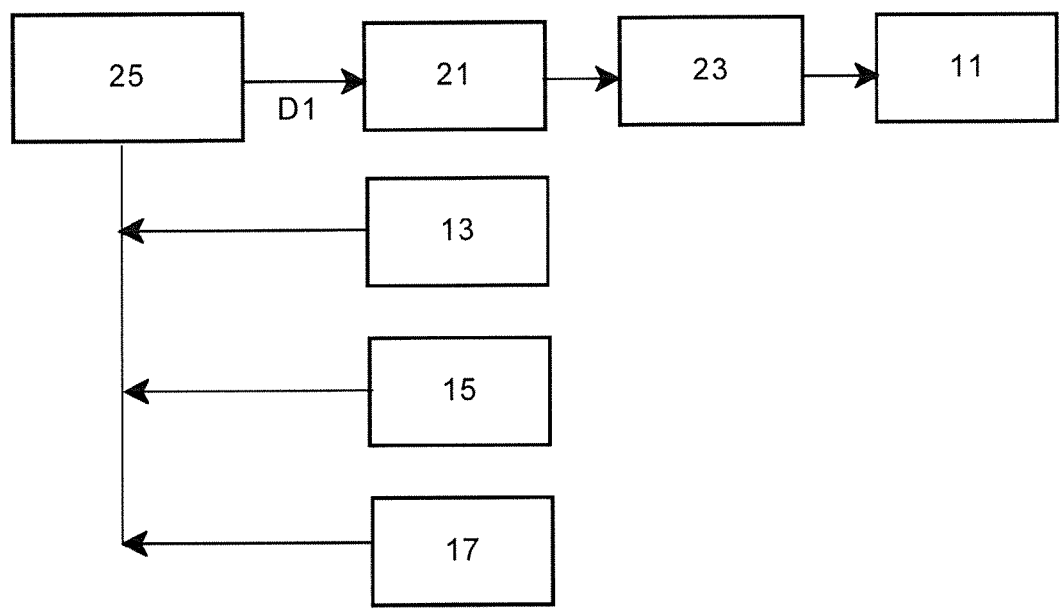
FIG. 1 is a block diagram of the method of this invention.
Figure 2A:
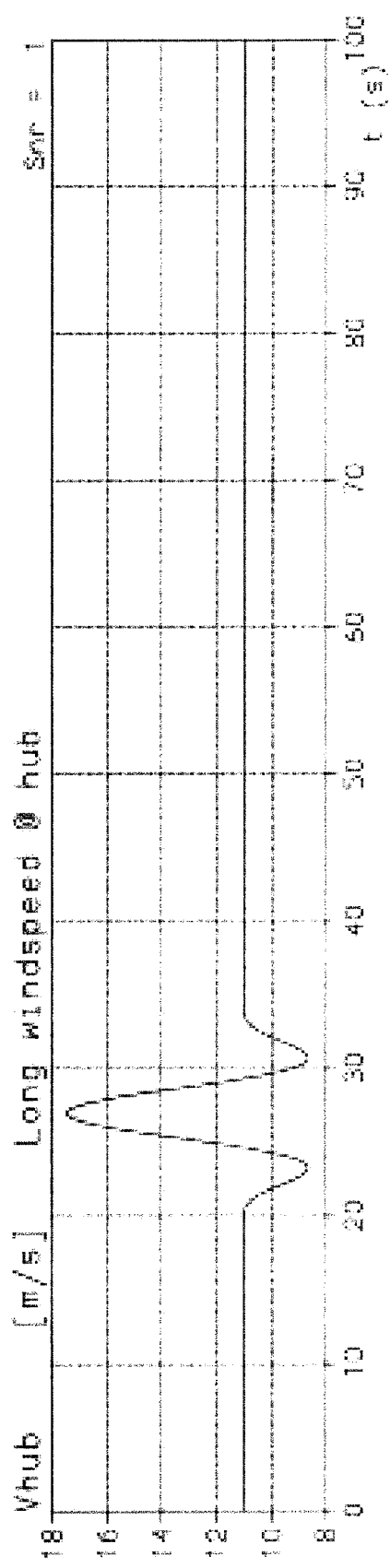
FIGS. 2a-d, shows several time-series of the simulated response by a wind turbine under an operational method according to this invention in the event of an extreme operating wind gust at 11 m/sec.
Figure 2A:
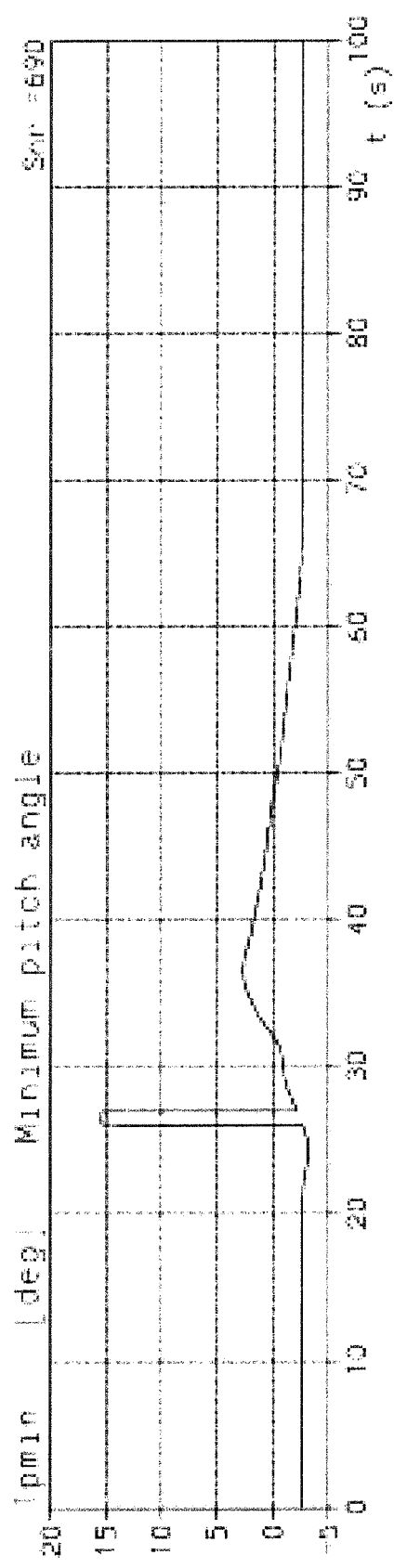
Figure 2B:
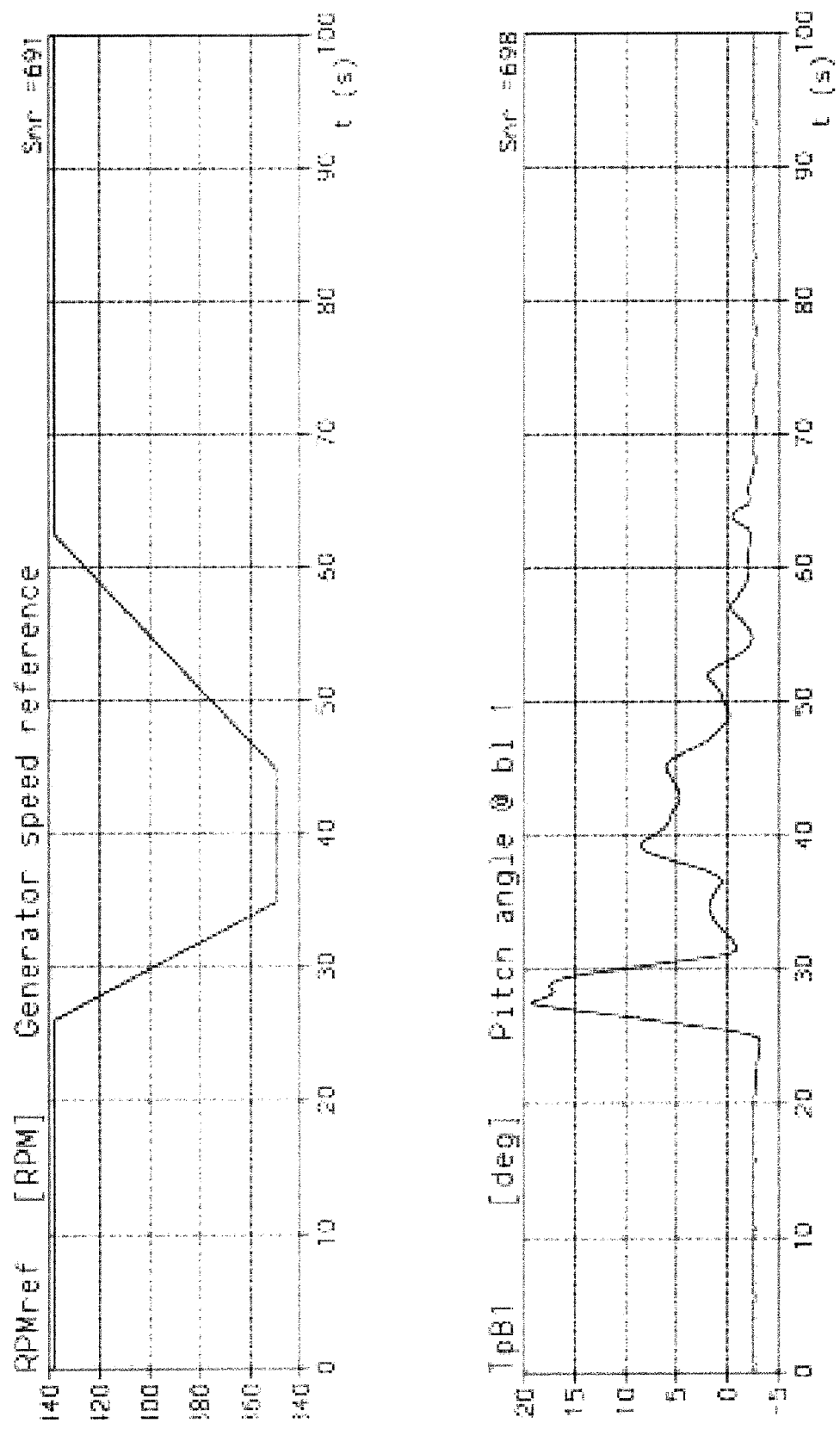
Figure 2C:
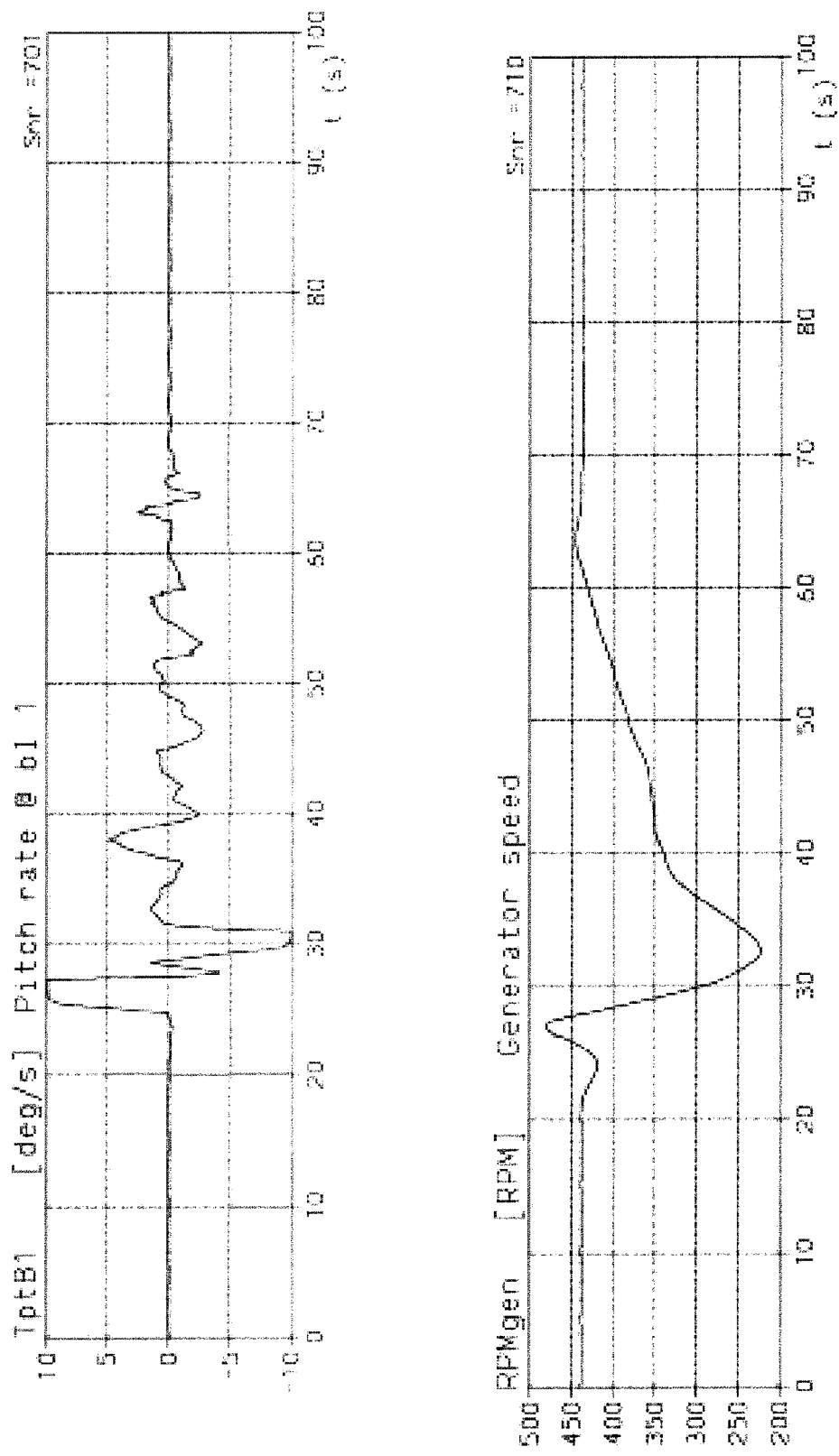
Figure 2D:
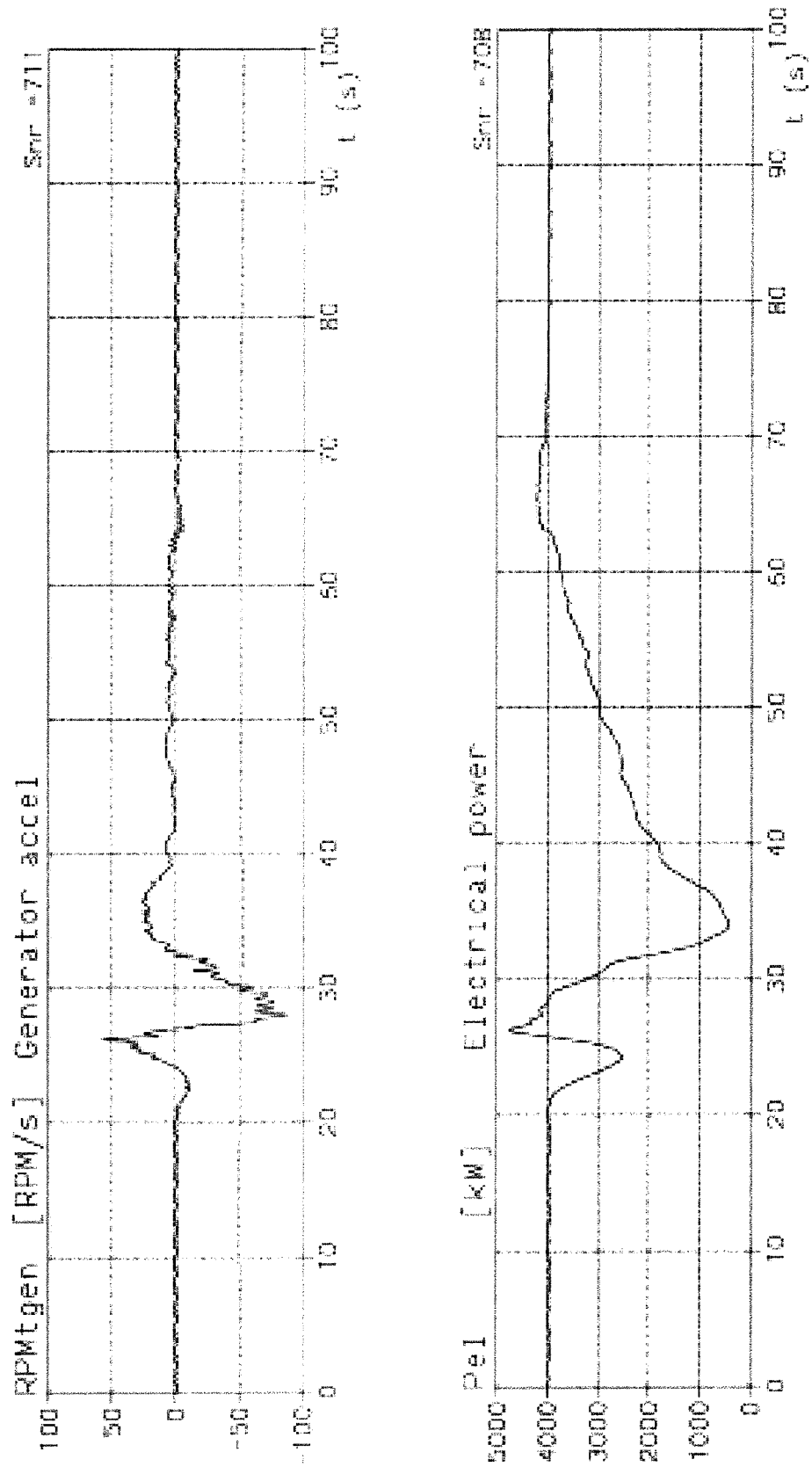

The international standard IEC 61400-1 Edition 2 specifies an ultimate design load case with a 50-year Extreme Operating Gust ($EOG_{50}$) that describes a coherent wind gust with a prescribed magnitude and a characteristic Gaussian-like shape Under an operational strategy of running through the wind gust without any shutdown this load case can produce negative effects in wind turbines such as:

Large rotor and generator over-speed.
Extreme bending moment in the blade root.
Extreme blade deflection towards the tower.
Extreme bending moment in the tower bottom.

In aeroelastic simulations the applicant has found that the main difference between the $EOG_{50}$ load case and the normal power production load cases is the magnitude and duration of the generator acceleration. In particular, it has been found that generator over-speeds of 20% are exceeded quite often during normal operation, but the duration of the excess is rather short compared to the $EOG_{50}$ load case in which the generator over-speed lasts longer.

Consequently, the criteria to be applied for increasing the pitch angle according to the method of this invention is the detection of a predetermined value for the generator acceleration, measured as a percentage of the generator nominal speed (GNS), in the range of 10% to 30% GNS/sec, with a preferred embodiment of 20% GNS/sec and a predetermined value for its duration in the range of 0,2 to 0,6 sec with a preferred embodiment of 0,4 sec.

In another preferred embodiment the gust is detected using lidar means mounted in the rotor hub as disclosed for instance in WO 2004/077068.

Regarding the pitch angle increase, it has been found that a pitch angle increase in the range of 6 to 14 deg, and preferably in the range of 12 to 14 deg, has a favorable effect both for the extreme blade bending moment and the extreme generator speed that may appear at different wind speeds. A larger pitch angle increase does not give a significant further reduction in the extreme maximum generator speed.

The pitch boost shall be performed as fast as possible, i.e. at the maximum pitch rate allowed by the wind turbine pitch control means which, for a large number of current turbines, it is comprised in the range of 8-10 deg/sec.

A fast pitch angle increase may result in a critical situation which could trigger another pitch boost as described above, because the decrease in the rotor speed immediately after the increase of the pitch angle may be followed by a large acceleration. To avoid this effect, the method according to this invention includes step c) in which in a first sub-step the generator speed is decreased, measured as a percentage of the generator nominal speed (GNS), at a rate in the range of 1% to 4% GNS/sec, with a preferred embodiment of 2% GNS/sec up to reach a generator speed in the range of 60% to 90% GNS, with a preferred embodiment of 80% GNS and in a second sub-step the generator speed is slowly increased at a rate in the range of 0,5% to 2% GNS/sec with a preferred embodiment of 1% GNS/sec up to reach the nominal speed.

This method can be implemented using the pitch control means available in known variable speed wind turbines as shown in FIG. 1.

Pitch control means involve blades 11, an actuator 21, an adjusting transmission 23 and a control device 25. The control device receives input data from the generator 13 and/or other wind turbine components 15, 17 and sends output data D1 to the actuator 21 for changing the angular position of the blades 11 according to predetermined rules.

According to the method of this invention, the control device 25 receives input data from the generator 13 or the lidar means mounted in the rotor 15 and after detecting an extreme operating wind gust sends output data D1 to the actuator 21 for increasing the pitch angle of the blades 11 towards the feathered position at a predetermined value. The pitch angle increase is done simply by changing the reference value that is used as an input parameter for the control device.

The time-series shown in FIG. 2 illustrates the results obtained with the operational method subject of the present invention in an example at 11 m/s. The pitch boost is activated at t=26 sec. Then the generator speed reference is changed to reach 350 rpm in about 9 sec, stay at 350 rpm during 10 sec and reach the nominal value of 440 rpm in about 18 sec.

Although the present invention has been fully described in connection with preferred embodiments, it is evident that modifications may be introduced within the scope thereof, not considering this as limited by these embodiments, but by the contents of the following claims.

The invention claimed is:

1. A method for the operation of a variable-speed wind turbine having pitch control means in cases of an extreme operating wind gust, wherein the method comprises the steps of:
   a) detecting the presence of an extreme operating wind gust according to the generator acceleration when the generator acceleration is higher than a predetermined value in the range of 10% to 30% of the generator nominal acceleration, GNS/sec, during a minimum predetermined period of time in the range of 0.2 sec to 0.6 sec; and
   b) performing a sudden increase of the pitch angle in the range of 6 to 14 degrees at the maximum pitch rate allowed by the wind turbine pitch control means.

2. A method for the operation of a variable-speed wind turbine according to claim 1, wherein said predetermined generator acceleration value is 20% of the generator nominal acceleration, GNS/sec.

3. A method for the operation of a variable-speed wind turbine according to claim 1, wherein said minimum predetermined period of time is 0.4 seconds.

4. A method for the operation of a variable-speed wind turbine according to claim 1, wherein the magnitude of said increase of the pitch angle is in the range of 12-14 degrees.

5. A method for the operation of a variable-speed wind turbine according to claim 1, further comprising the step of:
   c) varying the generator speed to avoid large generator accelerations that may result in the need for a subsequent step b).

6. A method for the operation of a variable-speed wind turbine according to claim 5, wherein step c) includes the following sub-steps:
   c1) decreasing the generator speed at a rate in the range of 1% to 4% of the generator nominal acceleration, GNS/sec, up to reach a generator speed value in the range of 60% to 90% of the generator nominal speed, GNS; and
   c2) increasing the generator speed at a rate in the range of 0.5% to 2% of the generator nominal acceleration, GNS/sec, up to reach the generator nominal speed.

7. A method for the operation of a variable-speed wind turbine according to claim 6, wherein said generator speed decreasing rate is 2% of the generator nominal acceleration, GNS/sec.

8. A method for the operation of a variable-speed wind turbine according to claim 6, wherein said generator speed value is 80% of the generator nominal speed, GNS.

9. A method for the operation of a variable-speed wind turbine according to claim 6, wherein said generator speed increasing rate is 1% of the generator nominal acceleration, GNS/sec.

* * * * *